US009263202B2

(12) United States Patent
Lee et al.

(10) Patent No.: US 9,263,202 B2
(45) Date of Patent: Feb. 16, 2016

(54) INTERNAL STACK-UP STRUCTURE OF TOUCH PANEL AND METHOD FOR PRODUCING THE SAME

(75) Inventors: Yuhwen Lee, Zhubei (TW); Keming Ruan, Fujian (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 440 days.

(21) Appl. No.: 13/640,780

(22) PCT Filed: Aug. 4, 2010

(86) PCT No.: PCT/CN2010/075693
§ 371 (c)(1),
(2), (4) Date: Jan. 15, 2013

(87) PCT Pub. No.: WO2011/127702
PCT Pub. Date: Oct. 20, 2011

(65) Prior Publication Data
US 2013/0105289 A1 May 2, 2013

(30) Foreign Application Priority Data

Apr. 11, 2010 (CN) .......................... 2010 2 0160223

(51) Int. Cl.
| H05K 5/00 | (2006.01) |
| H05K 7/00 | (2006.01) |
| G06F 1/16 | (2006.01) |
| H01H 9/02 | (2006.01) |
| G06F 3/041 | (2006.01) |
| H01H 11/00 | (2006.01) |

(52) U.S. Cl.
CPC ............... *H01H 9/02* (2013.01); *G06F 3/0412* (2013.01); *H01H 11/00* (2013.01); *G06F 2203/04103* (2013.01)

(58) Field of Classification Search
CPC ..... G06F 1/1601; G06F 1/1609; G06F 3/044; G06F 3/0412; G02F 1/13338
USPC ............... 361/679.01, 679.21, 679.26, 679.3; 345/173
See application file for complete search history.

(56) References Cited

U.S. PATENT DOCUMENTS

| 7,446,468 B2 * | 11/2008 | Hong et al. ................... 313/495 |
| 2005/0099402 A1 * | 5/2005 | Nakanishi et al. ............. 345/173 |
| 2006/0067651 A1 * | 3/2006 | Chui ............................. 385/147 |
| 2009/0160819 A1 * | 6/2009 | Sasaki et al. ................... 345/174 |
| 2010/0045910 A1 * | 2/2010 | Bitou et al. .................... 349/118 |

\* cited by examiner

*Primary Examiner* — Anthony Haughton
(74) *Attorney, Agent, or Firm* — Gokalp Bayramoglu

(57) ABSTRACT

The present invention relates to an internal stack-up structure of a touch panel including a touch sensing substrate having a joint area with an electronic assembly placed thereon; a cover substrate facing to and being spaced out from the touch sensing substrate and having a first border region with a first mask layer coated thereon, the first border region corresponding to the joint area; a reflection layer disposed on the first mask layer and corresponding to the electronic assembly; and a bonding layer formed at least between the electronic assembly and the reflection layer, the bonding layer being formed by liquid bonding materials which change from liquid state to solid state to improve the bonding strength between the cover substrate and the touch sensing substrate after being exposed to light reflected from the reflection layer.

24 Claims, 4 Drawing Sheets

INTERNAL STACK-UP STRUCTURE OF TOUCH PANEL AND METHOD FOR PRODUCING THE SAME

BACKGROUND OF THE INVENTION

1. Field of the Invention

The present invention relates to a touch panel, and more particularly, to an internal stack-up structure of a touch panel, and a method for producing the same.

2. Description of the Related Art

Touch screens are widely applied to varieties of appliances, such as LCD monitors, cell phones, game machines and so on.

A touch screen generally includes a display panel and a touch panel covered thereon. The touch panel includes a cover substrate for providing protection, anti-scratch, anti-glare, and/or anti-reflection and a touch sensing substrate with an electronic assembly placed thereon. The cover substrate faces to and is spaced out from the touch sensing substrate. The touch panel is constructed by bonding the touch sensing substrate to the cover substrate using liquid bonding materials which can be solidified while being exposed to light.

In order to prettify the appearance of the touch panel, the cover substrate generally has a mask layer coated on a border region of the cover substrate. The border region corresponds to the area where the electronic assembly is placed. The mask layer can avoid users noticing the electronic assembly and help achieving a good visual effect. However, the mask layer also prevents the liquid bonding materials from being exposed to light from the side of the cover substrate that the mask layer is formed on. Meanwhile, the electronic assembly prevents the liquid bonding materials from being exposed to light from the side of the touch sensing substrate because the light is blocked by the electronic assembly. Thus the liquid bonding materials will stay in liquid state, and it will weaken the bonding strength of the touch panel.

Thus, it is desired to provide an internal stack-up structure of a touch panel and a method for producing the same that overcomes the above drawbacks of the conventional touch panel.

SUMMARY OF THE INVENTION

In one aspect, an internal stack-up structure of a touch panel is provided including a touch sensing substrate having a joint area with an electronic assembly placed thereon; a cover substrate facing to and being spaced out from the touch sensing substrate and having a first border region with a first mask layer coated thereon, with the first border region corresponding to the joint area; a reflection layer disposed on the first mask layer and corresponding to the electronic assembly; and a bonding layer formed at least between the electronic assembly and the reflection layer, the bonding layer being formed by liquid bonding materials which changes from liquid state to solid state to improve the bonding strength after being exposed to light reflected by the reflection layer.

In another aspect, a method for producing an internal stack-up structure of a touch panel is provided, including: providing a cover substrate having a first border region; forming a first mask layer on the first border region; forming a reflection layer on the first mask layer; providing a touch sensing substrate having a joint area with an electronic assembly placed thereon; placing the touch sensing substrate facing to and being spaced out from the cover substrate with the reflection layer corresponding to the electronic assembly; disposing liquid bonding materials at least between the reflection layer and the electronic assembly; solidifying the liquid bonding materials by exposing the liquid bonding materials to light reflected from the reflection layer, wherein the light is generated by a light source outside of the touch sensing substrate.

Thus, the internal stack-up structure and the method can solidify the liquid bonding materials masked by the first mask layer and the electronic assembly by using the reflection layer to reflect light to the area where the liquid bonding materials are disposed, which will improve the bonding strength between the cover substrate and the touch sensing substrate. Moreover, the solidified bonding materials will not corrode the electronic assembly and the first mask layer.

DETAILED DESCRIPTION

The detailed description of the present invention will be discussed in the following embodiments, which are not intended to limit the scope of the present invention, but still can be adapted for other applications. While drawings are illustrated in details, it is appreciated that the quantity of the disclosed components would be greater or less than that is disclosed, except the components expressly restricting amount.

The present invention relates to an internal stack-up structure of a touch panel, including: a first substrate having a first mask area, a second substrate having a second mask area, the first substrate facing to and is spaced out from the second substrate with the first mask area corresponding to the second mask area, a reflection layer formed between the first mask area and the second mask area, a bonding layer disposed at least between the first mask area and the reflection layer, the bonding layer being formed by liquid bonding materials which changes from liquid state to solid state to improve the bonding strength between the first substrate and the second substrate. In a preferred embodiment, the first substrate is a touch sensing substrate and the first mask area is a joint area of the touch sensing substrate with an electronic assembly placed on the joint area; the second substrate is a cover substrate and the second mask area is a first border region of the cover substrate with a first mask layer coated on the first border region. The detail structure and producing method will be described as below.

Figure 1:
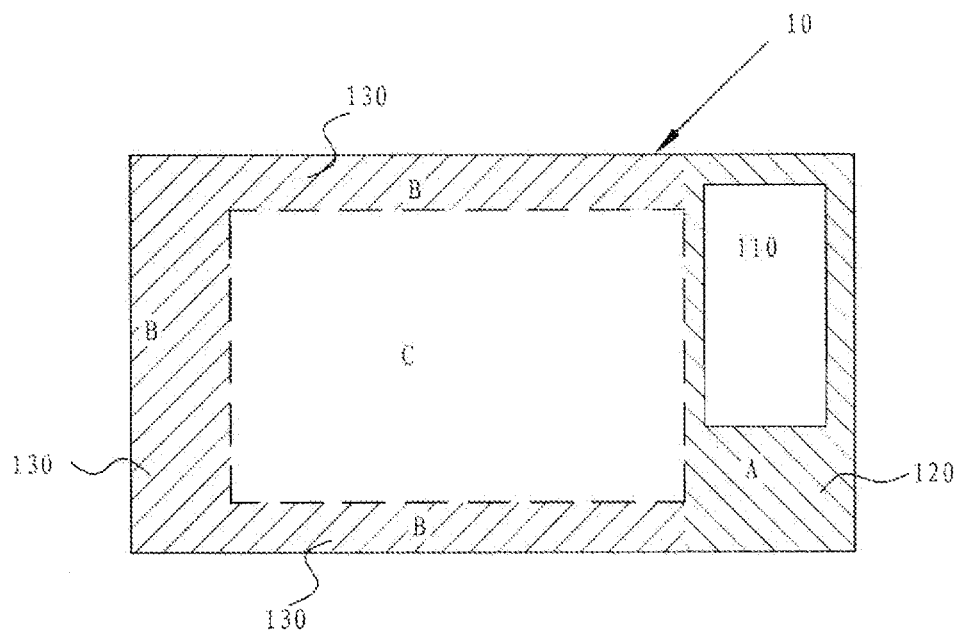
FIG. 1 is a schematic top view of a cover substrate according to a preferred embodiment of the present invention.
Figure 2:
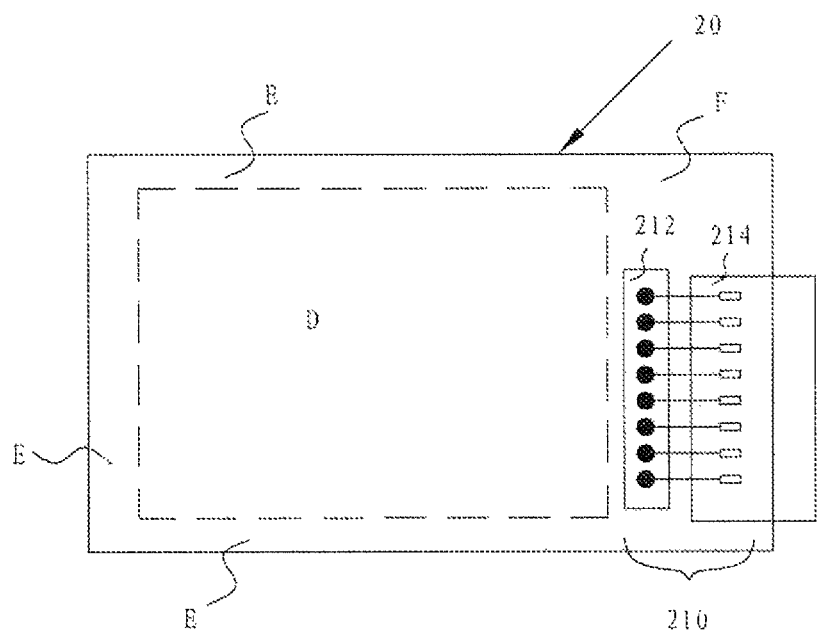
FIG. 2 is a schematic top view of a touch sensing substrate according to the preferred embodiment of the present invention.

FIG. 1 and FIG. 2 show assemblies of an internal stack-up structure of a touch panel according to the preferred embodiment of the present invention. FIG. 1 is a schematic top view of a cover substrate 10 and FIG. 2 is a schematic top view of a touch sensing substrate 20.

One surface of the cover substrate 10 that faces to the touch sensing substrate 20 includes a border region and a view area C surrounded by the border region. One part of the border region defines a first border region A and the other part of the border region defines a second border region B. A first mask layer 120 is formed on the first border region A, and a second mask layer 130 is formed on the second border region B.

One surface of the touch sensing substrate 20 that faces to the cover substrate 10 includes a non-visual area and a touch area D surrounded by the non-visual area. One part of the non-visual area defines a joint area F and the other part of the non-visual area defines a non-joint area E. An electronic assembly 210 is placed in the joint area F.

When the internal stack-up structure of this embodiment is constructed by laminating the cover substrate 10 with the touch sensing substrate 20, the first border region A will cover the joint area F, and the first mask layer 120 in the first border region A will mask the electronic assembly 210 placed in the joint area F to avoid users noticing the electronic assembly 210.

Furthermore, a reflection layer 110 is formed on the first mask layer 120. The size of the reflection layer 110 may be the same as the first border region A, but in most situations, the size may be smaller, as long as light from outside of the touch sensing substrate 20 can be reflected to the position where the bonding layer is formed, such as in this embodiment. The reflection layer 110 can be formed by evaporation, sputter, electroplating, printing or other manufacturing process. The material of the reflection layer 110 is selected from the group consisting of aluminum, chromium, silver, chromium and the like metals. The material of the reflection layer 110 also can be selected from the group consisting of oxide and nitride of above metals.

The cover substrate 10 further includes a protection layer 140 formed on the cover substrate 10 opposite to the first mask layer 120. The protection layer 140 includes at least one of the following layers: an anti-scratch layer, an anti-glare layer, and an anti-reflection layer.

The touch sensing substrate 20 also has a plurality of sensing electrodes (not shown) formed in the touch area D. The electronic assembly 210 includes a conductive layer 212 and a circuit board 214 electrically connected to the conductive layer 212. The sensing electrodes are electrically connected to the conductive layer 212 for transmitting touch signals to the circuit board 214. The material of the cover substrate 10 and the touch sensing substrate 20 may include glass or other materials with similar transparent and rigid feature.

Figure 3:
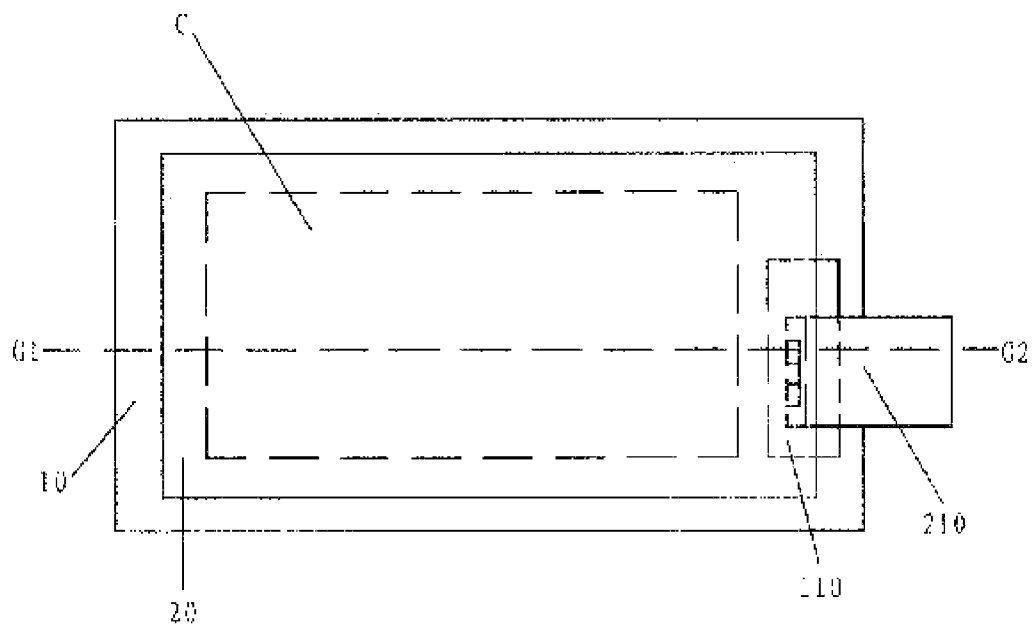
FIG. 3 is a schematic top view of an internal stack-up structure of a touch panel according to the preferred embodiment of the present invention.

Then refer to FIG. 3, which is a schematic top view of an internal stack-up structure of a touch panel according to the preferred embodiment of the present invention. The cover substrate 10 bonds to the touch sensing substrate 20 that faces to and is spaced out from the cover substrate 10, and the reflection layer 110 corresponds to the area where the electronic assembly 210 is placed. A bonding layer disposed between the cover substrate 10 and the touch sensing substrate 20 will be described in detail as below.

Figure 4:
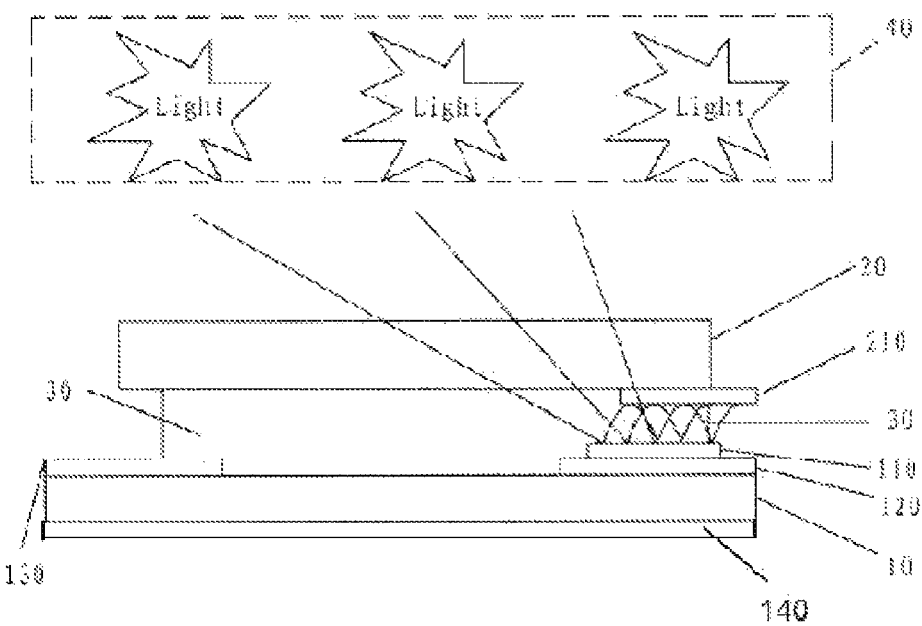
FIG. 4 is a schematic cross-sectional view taken along with the cross-sectional line G1-G2 in FIG. 3 according to a first exemplary embodiment of the present invention.

FIG. 4 is a cross-sectional view taken along with the G1-G2 line in FIG. 3 according to a first exemplary embodiment. A bonding layer 30 is formed at least between the electronic assembly 210 and the reflection layer 110. The bonding layer 30 is formed by liquid bonding materials which changes from liquid state to solid state. And the solid-state bonding materials will improve the bonding strength between the cover substrate 10 and the touch sensing substrate 20 and will not corrode the electronic assembly 210 and the first mask layer 120 either.

Generally, the liquid bonding materials are correspondingly adapted to a light source 40, and may be one kind of light-solidifying materials, which can be solidified by the light source 40. Because of the existence of the reflection layer 110, light from the light source 40 can be reflected to the area between the electronic assembly 210 and the reflection layer 110; hence the liquid bonding materials disposed in such area will be changed into expected solid state. In one preferred embodiment, the bonding layer 30 is in the form of colloid after being solidified. The light source 40 may be an ultraviolet light source or other light sources having enough power to make the liquid bonding materials react and solidify.

In the preferred embodiment, referring to FIG. 1 to FIG. 4, besides the first border region A, the cover substrate 10 also has a second border region B, and the touch sensing substrate 20 has a non-joint area E. In some cases, a few conductive layers may be formed in the non-joint area E, so a second mask layer 130 is formed in the second border region B for masking the conductive layers. The bonding layer 30 is also disposed between the second mask layer 130 and the touch sensing substrate 20 in the second border region B. In addition, the bonding layer 30 is also formed between the cover substrate 10 and the touch sensing substrate 20 in the view area C.

The light from the light source 40 will not be blocked while passing through the non-joint area E and the touch area D by assemblies like the electronic assembly 210. Thus the bonding layer 30 in such area can change into solid state by directly exposing the liquid bonding materials to the light source 40.

The same situation also occurs to some areas not being occupied by the electronic assembly 210 in the joint area F. The bonding layer 30 disposed between the first mask layer 120 and the touch sensing substrate 20 changes into solid state directly in the non-occupied area.

Figure 5:
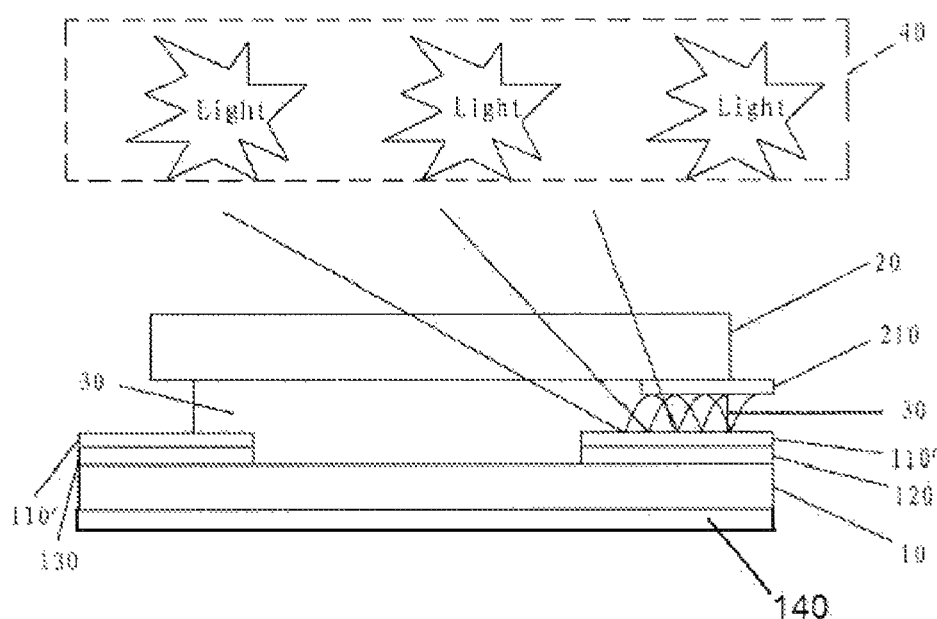
FIG. 5 is a schematic cross-sectional view taken along with the cross-sectional line G1-G2 in FIG. 3 according to a second exemplary embodiment of the present invention.

FIG. 5 is a cross-sectional view taken along the G1-G2 line in FIG. 3 according to a second exemplary embodiment of the present invention. A reflection layer 110' is formed on both the first mask layer 120 and the second mask layer 130. Thus the bonding layer 30 disposed between the cover substrate 10 and the touch sensing substrate 20 includes the following parts: a first part disposed between the reflection layer 110' and the electronic assembly 210, a second part disposed between the reflection layer 110' and the touch sensing substrate 20 in the above-mentioned non-occupied area and the second border region B, and a third part disposed between the cover substrate 10 and the touch sensing substrate 20 in the view area C. The three parts of the bonding layer 30 are solidified at one time by light reflected from the reflection layer 110'.

The size (or size ratio) of above mentioned assembly(ies), region(s), area(s) and other elements is sketched only for easy explanation and may not be fit to the real size (or size ratio). The products may have different sizes in accordance with practical design. For example, the boundary of the joint area F may be smaller than what is shown in FIG. 2, and the view area C generally is not necessarily the same as the touch area D.

Figure 6:
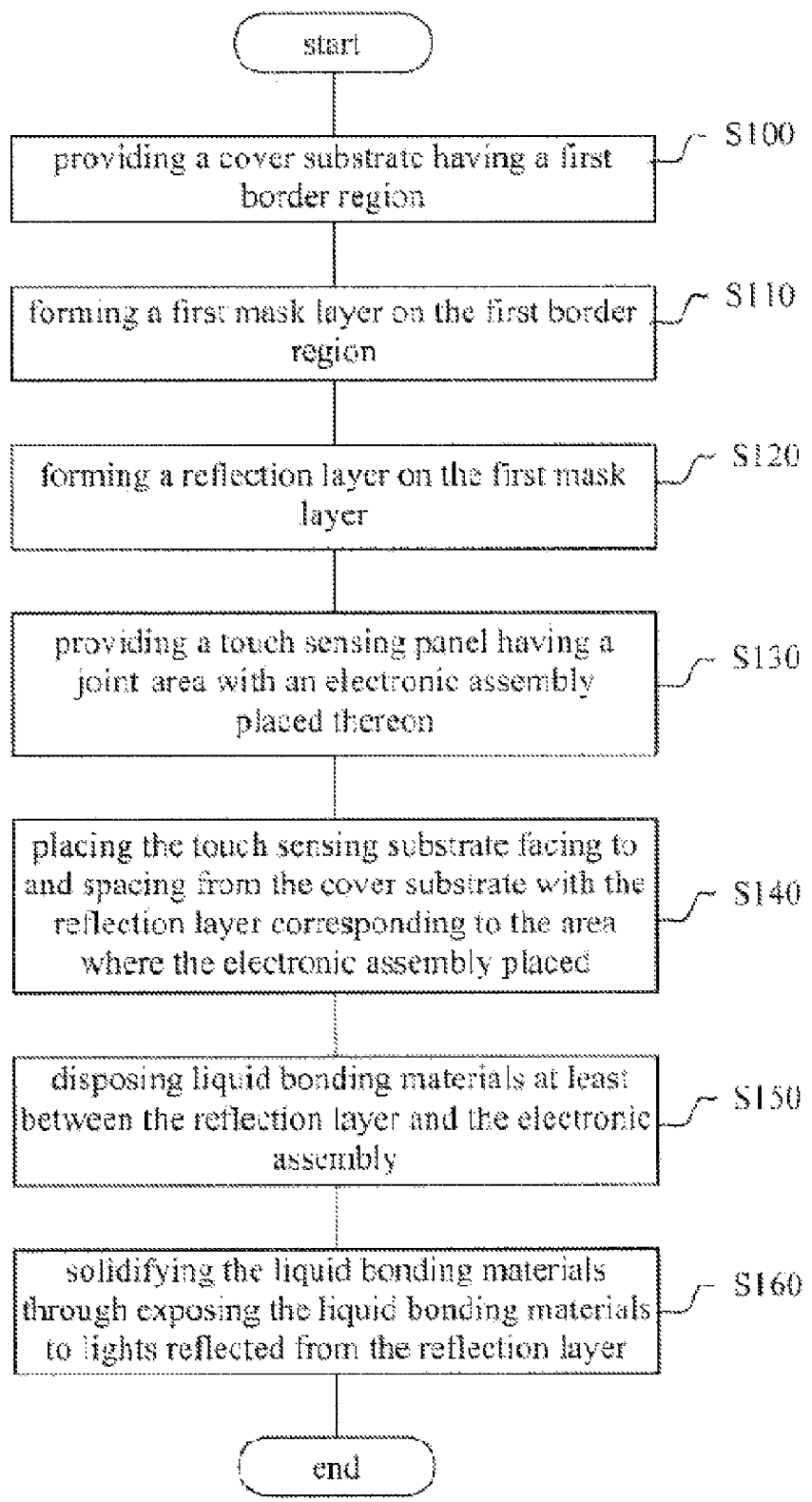
FIG. 6 is a schematic flow chart of a method for producing an internal stack-up structure of a touch panel according to the preferred embodiment of the present invention.

FIG. 6 is a flow chart illustrating a method of producing an internal stack-up structure of a touch panel. The method includes the following steps:

step 100: providing a cover substrate having a first border region.

step 110: forming a first mask layer on the first border region.

step 120: forming a reflection layer on the first mask layer.

step 130: providing a touch sensing panel having a joint area with an electronic assembly placed thereon.

step 140: placing the touch sensing panel facing to and being spaced out from the cover substrate with the reflection layer corresponding to the area where the electronic assembly is placed.

step 150: disposing liquid bonding materials at least between the reflection layer and the electronic assembly.

step 160: solidifying the liquid bonding materials by exposing the liquid bonding materials to light reflected from the reflection layer, wherein the light are generated by a light source outside of the touch sensing substrate.

The method further includes: forming a second mask layer on a second border region of the cover substrate while forming the first mask layer; disposing the liquid bonding materials between the second mask layer and the touch sensing substrate while disposing the liquid bonding materials between the reflection layer and the electronic assembly.

The method further includes: disposing the liquid bonding materials between the first mask layer and the touch sensing substrate in the above-mentioned non-occupied area while disposing the liquid bonding materials between the reflection layer and the electronic assembly in the step 150.

The method further includes: disposing the liquid bonding materials between the cover substrate and the touch sensing substrate in the above-mentioned view area while disposing the liquid bonding materials between the reflection layer and the electronic assembly in the step 150.

The method further includes: forming a reflection layer on the second mask layer while forming a reflection layer on the first mask layer.

The method further includes: disposing the liquid bonding materials between the reflection layer and the touch sensing substrate in the second border region and the above-mentioned non-occupied area while disposing the liquid bonding materials between the reflection layer and the electronic assembly in the step 150.

The method further includes: forming a transparent protection layer on the cover substrate opposite to the first mask layer.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. An internal stack-up structure of a touch panel, comprising: a touch sensing substrate having a joint area with an electronic assembly placed thereon; a cover substrate facing to and being spaced out from the touch sensing substrate and having a first border region with a first mask layer coated thereon, the first border region corresponding to the joint area; a reflection layer formed on the first mask layer and corresponding to the electronic assembly; the reflection layer formed in the first border region; and a bonding layer disposed at least between the electronic assembly and the reflection layer, the bonding layer being formed by liquid bonding materials which changes from liquid state to solid state to improve the bonding strength between the touch sensing substrate and the cover substrate; wherein the bonding layer is disposed between the cover substrate and the touch sensing substrate in the view area.

2. The internal stack-up structure according to claim 1, wherein the cover substrate further has a second border region with a second mask layer coated thereon.

3. The internal stack-up structure according to claim 2, wherein the bonding layer is also disposed between the second mask layer and the touch sensing substrate in the second border region.

4. The internal stack-up structure according to claim 1, wherein the cover substrate has a view area and the touch sensing substrate has a touch area.

5. The internal stack-up structure according to claim 1 wherein the material of the touch sensing substrate and cover substrate comprises glass.

6. The internal stack-up structure according to claim 1, wherein the liquid bonding materials are solidified by light.

7. The internal stack-up structure according to claim 1, wherein the liquid bonding materials are solidified by ultraviolet light.

8. The internal stack-up structure according to claim 1, wherein the material of the reflection layer is selected from the group consisting of aluminum, chromium, silver and chromium.

9. The internal stack-up structure according to claim 1, wherein the material of the reflection layer is selected from the group consisting of oxide of aluminum, chromium, silver, chromium and nitride of aluminum, chromium, silver, chromium.

10. The internal stack-up structure according to claim 1, wherein the electronic assembly comprises a conductive layer and a circuit board electrically connected to the conductive layer.

11. The internal stack-up structure according to claim 1, wherein the bonding layer is in the form of colloid after being solidified.

12. The internal stack-up structure according to claim 2, wherein the reflection layer is also formed on the second mask layer.

13. The internal stack-up structure according to claim 12, wherein the bonding layer is also formed between the touch sensing substrate and the reflection layer in the second border region and the area not being occupied by the electronic assembly.

14. The internal stack-up structure according to claim 1, wherein the bonding layer is also formed between the touch sensing substrate and the first mask layer in the area not being occupied by the electronic assembly.

15. The internal stack-up structure according to claim 1, further comprising a protection layer formed on the cover substrate opposite to the first mask layer.

16. The internal stack-up structure according to claim 15, wherein the protection layer comprises an anti-scratch layer, an anti-glare layer and/or an anti-reflection layer.

17. A method for producing an internal stack-up structure of a touch panel, comprising: providing a cover substrate having a first border region; forming a first mask layer on the first border region; forming a reflection layer on the first mask layer; providing a touch sensing substrate having a joint area with an electronic assembly placed thereon; placing the touch sensing substrate facing to and being spaced out from the cover substrate with the reflection layer corresponding to the electronic assembly; the reflection layer formed in the first border region; disposing liquid bonding materials at least between the reflection layer and the electronic assembly; and solidifying the liquid bonding materials by exposing the liquid bonding materials to light reflected from the reflection layer, wherein the light are generated by a light source outside of the touch sensing substrate; wherein the bonding layer is disposed between the cover substrate and the touch sensing substrate in the view area.

18. The method according to claim 17, wherein the light source is an ultraviolet light source with enough power to make the liquid bonding materials solidify.

19. The method according to claim 17, further comprising: forming a second mask layer on a second border region of the cover substrate while forming the first mask layer; and disposing the liquid bonding materials between the second mask layer and the touch sensing substrate while disposing the liquid bonding materials between the reflection layer and the electronic assembly.

20. The method according to claim 17, further comprising: forming a second mask layer on a second border region of the cover substrate while forming the first mask layer;

forming the reflection layer on the second mask layer while forming the reflection layer on the first mask layer; and disposing the liquid bonding materials between the reflection layer and the touch sensing substrate in the second border region and the area not being occupied by the electronic assembly.

21. A method according to claim 17, further comprising: disposing the liquid bonding materials between the cover substrate and the touch sensing substrate.

22. The method according to claim 17, further comprising: forming a protection layer on the cover substrate opposite to the first mask layer.

23. An internal stack-up structure of a touch panel, comprising: a first substrate having a first mask area; a second substrate having a second mask area; the first substrate facing to and being spaced out from the second substrate with the first mask area corresponding to the second mask area; a reflection layer formed between the first mask area and the second mask area; the reflection layer formed in the first border region; a bonding layer disposed at least between the first mask area and the reflection layer, the bonding layer being formed by liquid bonding materials which change from liquid state to solid state to improve the bonding strength between the first substrate and the second substrate; and wherein the bonding layer is disposed between the cover substrate and the touch sensing substrate in the view area.

24. The internal stack-up structure according to claim 23, wherein the first substrate is a touch sensing substrate and the first mask area is a joint area with an electronic assembly placed on the joint area, and the second substrate is a cover substrate and the second mask area is a first border region with a first mask layer coated on the first border region.

* * * * *